M. A. DEES.
PNEUMATIC TIRE.
APPLICATION FILED JAN. 3, 1911.
1,045,955.
Patented Dec. 3, 1912.
Fig. I.
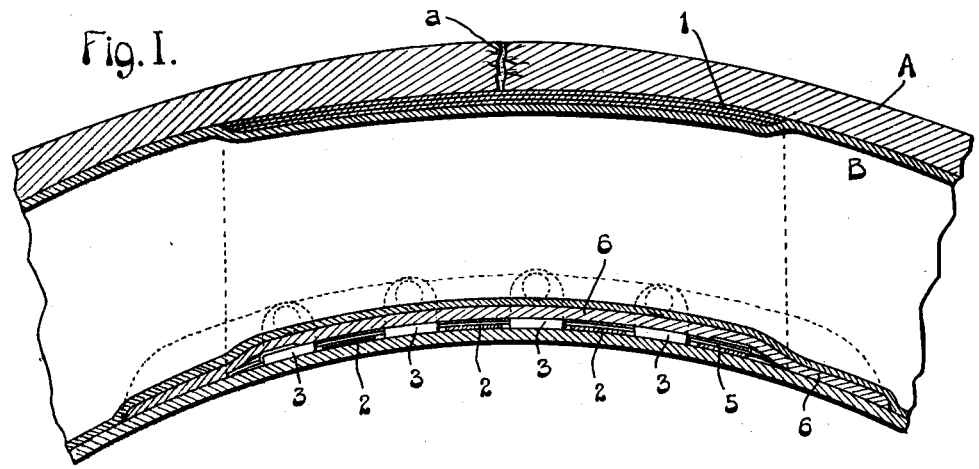
Fig II.
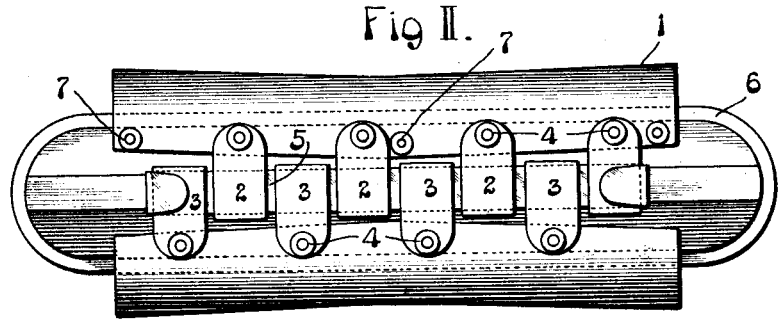
Fig. III.
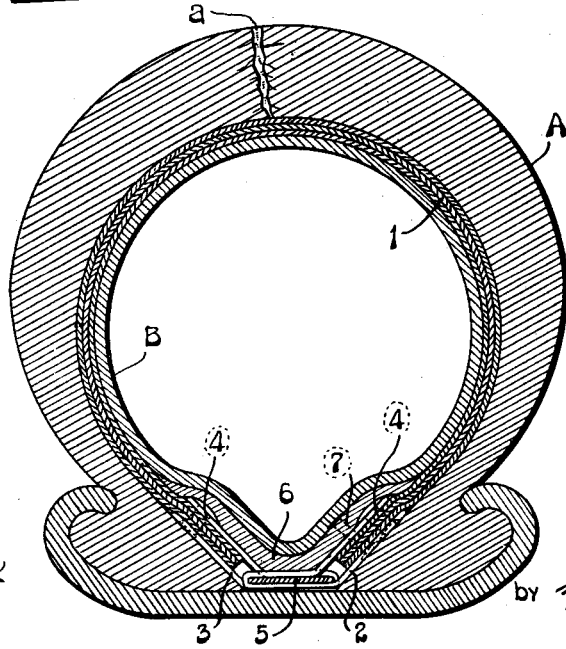
Attest
Inventor:
M. A. Dees
by Knight & Cook
ATT'YS.

UNITED STATES PATENT OFFICE.

MARK A. DEES, OF PASCAGOULA, MISSISSIPPI, ASSIGNOR TO AMERICAN TIRE COMPANY, OF ST. LOUIS, MISSOURI, A CORPORATION OF MISSOURI.

PNEUMATIC TIRE.

1,045,955.     Specification of Letters Patent.     Patented Dec. 3, 1912.

Application filed January 3, 1911. Serial No. 600,449.

*To all whom it may concern:*

Be it known that I, MARK A. DEES, a citizen of the United States of America, residing at Pascagoula, in the county of Jackson and State of Mississippi, have invented certain new and useful Improvements in Pneumatic Tires, of which the following is a full, clear, and exact description, reference being had to the accompanying drawings, forming part of this specification.

My invention relates to pneumatic tires and it pertains particularly to a shield for the inner tube of a pneumatic tire by virtue of which said inner tube may be held away from a fractured or weakened portion of the outer casing of the tire, thereby preventing what is commonly known as a "blow-out" of the inner tube.

Figure I is a longitudinal section through a fragment of a pneumatic tire with one of my shields therein located at a breach in the outer casing of the tire. Fig. II is a face view of the shield shown in Fig. I, showing the means by which the edges of the shield are held from separation and the flap by which the inner tube is protected from the fastening means of the shield. Fig. III is an enlarged cross section through the tire shown in Fig. I.

In the accompanying drawings:—A designates the outer casing of a pneumatic tire in which is shown at *a* a breach or fracture through which the inner tube within the outer casing might become exposed, with the result of a "blow out" in the absence of any means to prevent such exposure.

B is the inner tube in the outer casing.

1 designates my shield within which the inner tube B is adapted to be partially incased at the location of a breach in the outer casing, such as that at *a*, this shield being preferably composed of a plurality of layers of fabric, although it may be of a single layer of fabric, or be made of any other suitable material. This shield is intended to be placed within the pneumatic tire so that its separated edges are located at the inner circle of the tire and the shield has attached to it at its separated edges sets of loops 2 and 3, the loops 2 being attached to the shield adjacent to one of its edges, and the loops 3 being attached to the shield adjacent its other edge. The loops may be made of any suitable material and are preferably attached to the shield by rivets 4.

5 is a key extending longitudinally of the shield through the loops 2 and 3 and by which the shield is held in a contracted condition when in service. The key is preferably a strip of metal, the ends of which may be bent over to lie against the endless connecting loops, as seen in Figs. I and II, after the key has been threaded through the several loops of the shield. The key 5 may be either flat, as shown, or round; but it is preferably made flat, and there is preferably furnished with each shield a plurality of keys of different widths so that a more or less contraction of the shield may be produced according to the width of the key that is made use of. For instance, if it is desired to use the shield within a tire casing of smaller diameter than another tire casing, a wide key would be utilized and a narrower key would be employed for a casing of greater diameter.

The furnishing of keys of different widths is also important, for the reason that a tire casing that may be of one diameter when new becomes stretched to another diameter after it has been in service for some time, and a key would be serviceable for use with the shield when the casing is new that would not be suitable when the casing has become stretched and greater diameter of the shield to suit the greater diameter of the casing would be provided for. The loop connecting key is a rigid member and therefore may be readily threaded through the several loops 2 and 3 of the shield to hold the edges of the shield from spreading apart while the shield is in service and being a rigid member serves in connection with the loops as a most efficient means for maintaining the shield in its proper shape.

An important feature in my shield is that of its being so originally made that when the edges of the shield are connected, the shield is of less diameter at its central portion than at its ends. The object in so making the shield is to provide for the end portions of the shield fitting snugly against the outer casing of a tire when initial inflation of the inner tube of the tire B takes place, thereby preventing creeping of the inner tube into spaces between the shield and the outer casing to become pinched by these members and suffer injury by reason of pinching action. The shield is pliable and consequently the initial pressure of air in the expansion of the inner tube causes positive seating of the inner portions of the shield against the outer casing to attain the objects sought, and as the degree of pressure increases in the inner tube, the central portion of the shield is forced outwardly by reason of the greater pressure thereagainst.

To provide against injury of the inner tube of the tire by the fastening devices employed to connect the edges of my shield, I incorporate in the shield a guard flap 6 that is secured to the shield adjacent one of its edges, preferably by rivets 7. This guard flap is located interiorly of the shield when it is in service and spans the gap between the connected edges of the shield at which the fastening devices are located. The flap is of greater length than the shield and by reason of this greater length it has extensions that protrude beyond the fastening devices and act to prevent any contact between the inner tube and the shield fastening devices, thereby obviating any opportunity of the inner tube suffering injury at the ends of the shield.

I claim:—

1. A shield of the character described having separable edges and means for holding the edges in contracted positions, and a guard flap spanning the means for connecting the edges, the ends of the flap protruding beyond the ends of the shield.

2. The combination with the inner air tube of a pneumatic tire, of a repair patch therefor comprising a flexible strap encircling said air tube; means engaging the adjacent extremities of said strap for adjusting the latter about said tube; and a member within said strap and spanning the gap between the adjacent ends thereof, the respective extremities of said member being extended beyond the corresponding extremities of said strap, substantially as described.

3. A shield of the character described having means for holding it in a contracted condition, the shield being of smaller diameter at its central portion than at its ends.

MARK A. DEES.

In the presence of—
A. J. McCauley,
E. B. Linn.

Copies of this patent may be obtained for five cents each, by addressing the "Commissioner of Patents, Washington, D. C."